(12) United States Patent
Machida (10) Patent No.: US 10,740,051 B2
(45) Date of Patent: Aug. 11, 2020

(54) INFORMATION PROCESSING SYSTEM, INFORMATION PROCESSING METHOD, AND RECORDING MEDIUM

(71) Applicant: Daisuke Machida, Kanagawa (JP)

(72) Inventor: Daisuke Machida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/655,517

(22) Filed: Oct. 17, 2019

(65) Prior Publication Data

US 2020/0159477 A1 May 21, 2020

(30) Foreign Application Priority Data

Nov. 19, 2018 (JP) ................ 2018-216889
Mar. 1, 2019 (JP) ................ 2019-037951

(51) Int. Cl.
*G06F 3/12* (2006.01)
*G06F 21/44* (2013.01)

(52) U.S. Cl.
CPC .......... *G06F 3/1238* (2013.01); *G06F 3/1222* (2013.01); *G06F 3/1292* (2013.01); *G06F 21/445* (2013.01)

(58) Field of Classification Search
CPC .... G06F 3/1238; G06F 3/1222; G06F 3/1292; G06F 21/445
See application file for complete search history.

(56) References Cited

U.S. PATENT DOCUMENTS

2013/0229687 A1* 9/2013 Yamauchi .......... H04N 1/00392
358/1.15
2014/0123237 A1* 5/2014 Gaudet ................... H04L 63/08
726/4

FOREIGN PATENT DOCUMENTS

| JP | 2014-167664 | 9/2014 |
| JP | 2017-211997 | 11/2017 |
| JP | 6347533 | 6/2018 |

* cited by examiner

*Primary Examiner* — Quang N Vo
(74) *Attorney, Agent, or Firm* — IPUSA, PLLC (57) ABSTRACT

An information processing system includes a transmitter, wherein upon detecting that a user is authenticated; that a mobile terminal apparatus is present within a predetermined range from a server; and that print data is input from each of plural mobile terminal apparatuses to the server, the transmitter transmits: a print confirmation report to a first mobile terminal apparatus detected to be within the predetermined range, a report, that indicates an image forming apparatus is being used by the user owning the first mobile terminal apparatus, to a second mobile terminal apparatus, and the print data to the image forming apparatus after attaching authentication information to the print data received from the first mobile terminal apparatus, only upon detecting that the user of the first mobile terminal apparatus has approved the printing in response to the print confirmation report. The image forming apparatus prints the transmitted print data.

7 Claims, 8 Drawing Sheets

FIG.8C

INFORMATION PROCESSING SYSTEM, INFORMATION PROCESSING METHOD, AND RECORDING MEDIUM

CROSS-REFERENCE TO RELATED APPLICATION

The present application is based on and claims priority under 35 U.S.C. § 119 to Japanese Patent Application No. 2018-216889, filed on Nov. 19, 2018 and Japanese Patent Application No. 2019-037951, filed on Mar. 1, 2019, the contents of which are incorporated herein by reference in their entirety.

BACKGROUND OF THE INVENTION

1. Field of the Invention

The present invention relates to an information processing system, an information processing method, and a recording medium.

2. Description of the Related Art

The use of Bring Your Own Device (BYOD) has increased due to the changes in work styles and the spread of mobile terminal apparatuses in recent years. BYOD is a form of connecting a mobile terminal apparatus owned by a user to an in-house network and the like, for use in business operations. A mobile terminal apparatus is a portable terminal device such as a smartphone, a mobile phone, a notebook computer and the like. As the use of BYOD increases, it is also necessary for an image forming apparatus to operate in cooperation with devices corresponding to BYOD, so as to enhance the convenience. As an example, cooperation of authentication is a keyword that can be used.

Patent Document 1 discloses a technique in which authentication information only needs to be input once, when printing with an image forming apparatus. In the related art described in Patent Document 1, user authentication is performed at the mobile terminal apparatus, and accordingly, print data is transmitted from the mobile terminal apparatus, at which user authentication has been performed, to the image forming apparatus. According to this kind of related art according to Patent Document 1, from a position that is a specified distance away from a server located near the image forming apparatus, the print data is transmitted from the mobile terminal apparatus at which user authentication has been performed, and when the distance from the mobile terminal apparatus to the server falls below the specified distance, the image forming apparatus can execute the printing based on the print data.

Patent Document 1: Japanese Unexamined Patent Application Publication No. 2014-167664

SUMMARY OF THE INVENTION

According to one aspect of the present invention, there is provided an information processing system including an image forming apparatus; a server; and a mobile terminal apparatus. The server includes processing circuitry; and a memory storing computer-executable instructions that cause the processing circuitry to: authenticate a user based on authentication information that indicates the user has been authenticated, measure a distance between the server and the mobile terminal apparatus, detect the mobile terminal apparatus that is present within a predetermined range from the server by using the measured distance, and transmit, wherein upon detecting that the user has been authenticated; that the mobile terminal apparatus that is present within the predetermined range from the server is detected; and that the server has received input of print data from each of a plurality of the mobile terminal apparatuses: a print confirmation report, which is for confirming whether printing is allowed or rejected, to a first mobile terminal apparatus that is the mobile terminal apparatus detected to be present within the predetermined range among the plurality of the mobile terminal apparatuses, a report, which indicates that the image forming apparatus is being used by the user who owns the first mobile terminal apparatus, to a second mobile terminal apparatus other than the first mobile terminal apparatus among the plurality of the mobile terminal apparatuses, and the print data to the image forming apparatus after adding the authentication information to the print data received from the first mobile terminal apparatus, only upon detecting that the user of the first mobile terminal apparatus has approved the printing in response to the print confirmation report. The image forming apparatus includes processing circuitry; and a memory storing computer-executable instructions that cause the processing circuitry of the image forming apparatus to: print a content of the print data to which the authentication information is added and transmitted from the server.

DETAILED DESCRIPTION OF THE PREFERRED EMBODIMENTS

In the technique described in Patent Document 1, for example, in a state where first print data from a first mobile terminal apparatus owned by a first user and second print data from a second mobile terminal apparatus owned by a second user have been transmitted to the image forming apparatus, and the first user wishes to execute the printing after a specified amount of time elapses, but the first user approaches the server for a purpose other than collecting printed matter before the specified amount of time elapses, the image forming apparatus will inadvertently execute the printing by the first print data, and the first user will not be aware of the printed matter being output by this inadvertent printing. In such a situation, when the second user, who has executed printing based on the second print data after the first user, approaches the image forming apparatus to retrieve the printed matter of the second print data, the second user may have to wait until the printing of the first print data by the first user ends. Further, in such a situation, the second user may inadvertently retrieve the printed matter printed by the first user, thereby creating the risk of theft. Further, the second user may view the printed matter printed by the first, thereby creating the risk of violation of privacy.

A problem to be addressed by an embodiment of the present invention is to protect the user's privacy while preventing theft of printed matter.

Hereinafter, an embodiment for carrying out the present invention will be described with reference to the drawings.

First Embodiment

Figure 1:
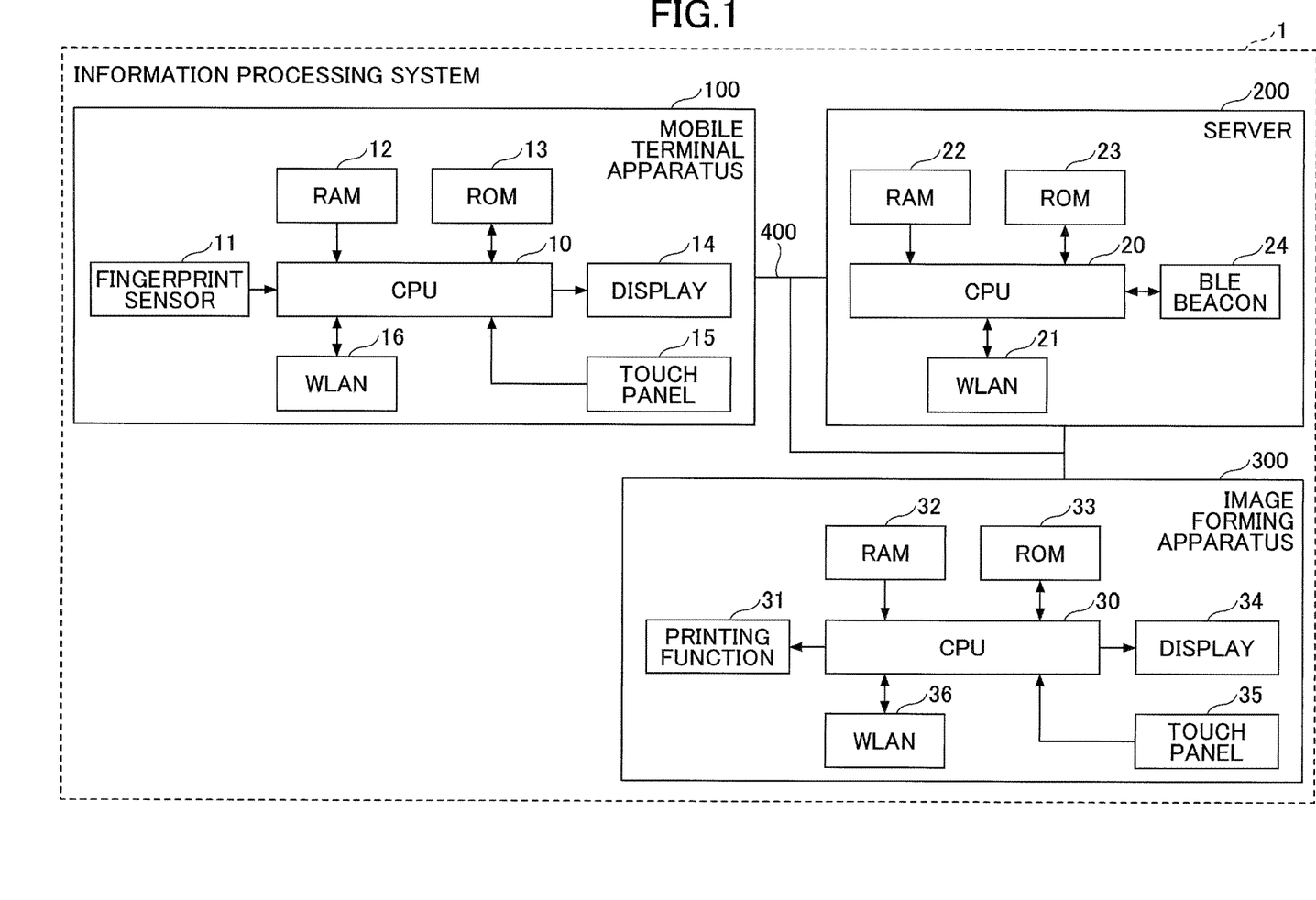
FIG. 1 is a diagram illustrating an example of a configuration of an information processing system according to a first embodiment of the present invention.

FIG. 1 is a diagram illustrating a configuration example of an information processing system 1 according to a first embodiment of the present invention. The information processing system 1 according to the first embodiment includes a mobile terminal apparatus 100, a server 200, and an image forming apparatus 300. The server 200 is an example of a second information processing apparatus, and the image forming apparatus 300 is an example of a first information processing apparatus.

The mobile terminal apparatus 100 includes a central processing unit (CPU) 10, a fingerprint sensor 11, a random access memory (RAM) 12, a read-only memory (ROM) 13, a display 14, a touch panel 15, and a Wireless Local Area Network (WLAN) 16.

The WLAN 16 is a communication interface for connecting the mobile terminal apparatus 100 to a network 400. The network 400 may be the Internet, an intranet, or the like. The network 400 is not limited to the Internet or an intranet, as long as the network 400 is a communication network capable of transmitting information, and may be a network for mobile terminals.

The CPU 10 comprehensively controls the operations of the mobile terminal apparatus 100. The CPU 10 controls the operations of the entire mobile terminal apparatus 100 by executing programs stored in the ROM 13 or the like, using the RAM 12 as a work area.

The server 200 includes a CPU 20, a WLAN 21, a RAM 22, a ROM 23, and a Bluetooth Low Energy (BLE) (registered trademark) beacon 24. The WLAN 21 is a communication interface for connecting the server 200 to the network 400. "BLE" is the designation of Version 4.0 in the specification of Bluetooth (registered trademark), which is one of the near field communication standards for digital equipment that is a wireless Personal Area Network (PAN) technology. The BLE beacon 24 can broadcast a BLE advertising packet, embedded with a Universally Unique Identifier (UUID) or a Uniform Resource Locator (URL), to the surroundings, and cause the mobile terminal apparatus 100, which has received this BLE advertising packet, to operate in accordance with the present position.

The image forming apparatus 300 is, for example, a multifunction peripheral, a copier, a scanner, a facsimile machine, a printer, or the like. The image forming apparatus 300 includes a CPU 30, a printing function 31, a RAM 32, a ROM 33, a display 34, a touch panel 35, and a WLAN 36.

The CPU 30 performs general-purpose information processing for causing the image forming apparatus 300 to implement a function of a multifunction peripheral, a function of a copier, a function of a scanner, a function of a facsimile machine, or a function of a printer. The touch panel 35 is a user interface that accepts an operation by a user to the multifunction peripheral and provides information to the user by displaying information corresponding to the operation. The WLAN 36 is a communication interface for connecting the image forming apparatus 300 to the network 400.

The printing function 31 is a printing unit that prints the contents of print data to which authentication information is added, the print data being transmitted from a transmitting unit of the server 200 that will be described later.

Figure 2:
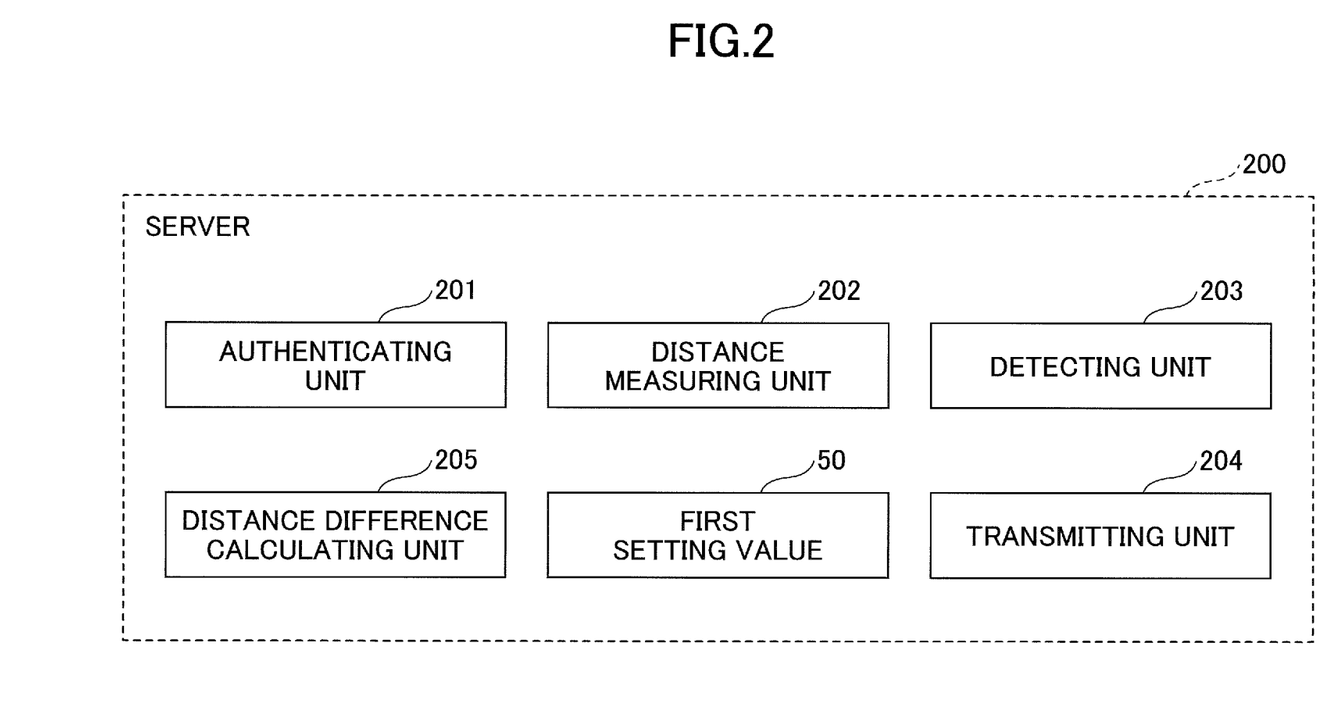
FIG. 2 is a diagram illustrating an example of a software configuration of a server illustrated in FIG. 1 according to the first embodiment of the present invention.

FIG. 2 is a diagram illustrating an example of a software configuration of the server 200 illustrated in FIG. 1. The server 200 includes an authenticating unit 201, a distance measuring unit 202, a detecting unit 203, a transmitting unit 204, and a distance difference calculating unit 205.

In the case of implementing the server 200, a program for the server 200 is stored in the ROM 23 illustrated in FIG. 1, and as the CPU 20 executes the program, the authenticating unit 201, the distance measuring unit 202, the detecting unit 203, the transmitting unit 204, and the distance difference calculating unit 205 of the server 200 are implemented.

The program for the server 200 is a program that executes functions of the authenticating unit 201, the distance measuring unit 202, the detecting unit 203, the transmitting unit 204, and the distance difference calculating unit 205.

The authenticating unit 201 authenticates a user based on authentication information that indicates the mobile terminal apparatus 100 has authenticated the user.

The distance measuring unit 202 measures the distance between the server 200 and the mobile terminal apparatus 100 by using the BLE beacon 24. The description of the distance measuring method using the BLE beacon 24 is omitted here, because the method is known as described in, for example, in Japanese Patent No. 6347533.

The detecting unit 203 detects the mobile terminal apparatus 100 that is present within a specified range from the server 200, by using the distance measured by the distance measuring unit 202. For determining whether the mobile terminal apparatus 100 is present within a specified range from the server 200, for example, a first setting value 50 is used. The first setting value 50 is distance information for determining whether the mobile terminal apparatus 100 is present within a specified range from the server 200. The first setting value 50 may be, for example, a several meters to several tens of meters, and is stored in the ROM 23 of the server 200 in advance. The first setting value 50 is set based on the distance at which the server 200 can receive print data and ticket information transmitted from the mobile terminal apparatus 100.

Note that it is assumed that the server 200 is disposed near the image forming apparatus 300. "Near" includes, for example, a state in which the image forming apparatus 300 is installed in a range visible from the server 200, a state in which the server 200 is disposed next to the image forming apparatus 300, and a state in which the server 200 is disposed several meters away from the image forming apparatus 300.

When the authenticating unit 201 has authenticated the user and the detecting unit 203 has detected the mobile terminal apparatus 100 present within a specified range from the server 200, and print data is input from each of a plurality of the mobile terminal apparatuses 100, the transmitting unit 204 transmits a print confirmation report, which is a report for confirming whether printing is allowed or rejected, to a first mobile terminal apparatus that is present within the specified range, among the plurality of the mobile terminal apparatuses 100. The print confirmation report includes information indicating a report for confirming whether printing is allowed or rejected.

The transmitting unit 204 sends a report, which indicates that the user who owns the first mobile terminal apparatus is currently using the image forming apparatus 300, to the second mobile terminal apparatus other than the first mobile terminal apparatus among the plurality of the mobile terminal apparatuses 100. Only after the user of the first mobile terminal apparatus has approved the printing in response to the print confirmation report, does the transmitting unit 204 add authentication information to the print data from the first mobile terminal apparatus, and then transmit the print data to the image forming apparatus 300.

When the distance measured by the distance measuring unit 202 (the first distance) is greater than a detectable distance (the second distance) in which the detecting unit 203 can detect the mobile terminal apparatus 100, the distance difference calculating unit 205 calculates the distance difference corresponding to the difference between the first distance and the second distance. The second distance is equal to the distance set as the first setting value 50.

Figure 3:
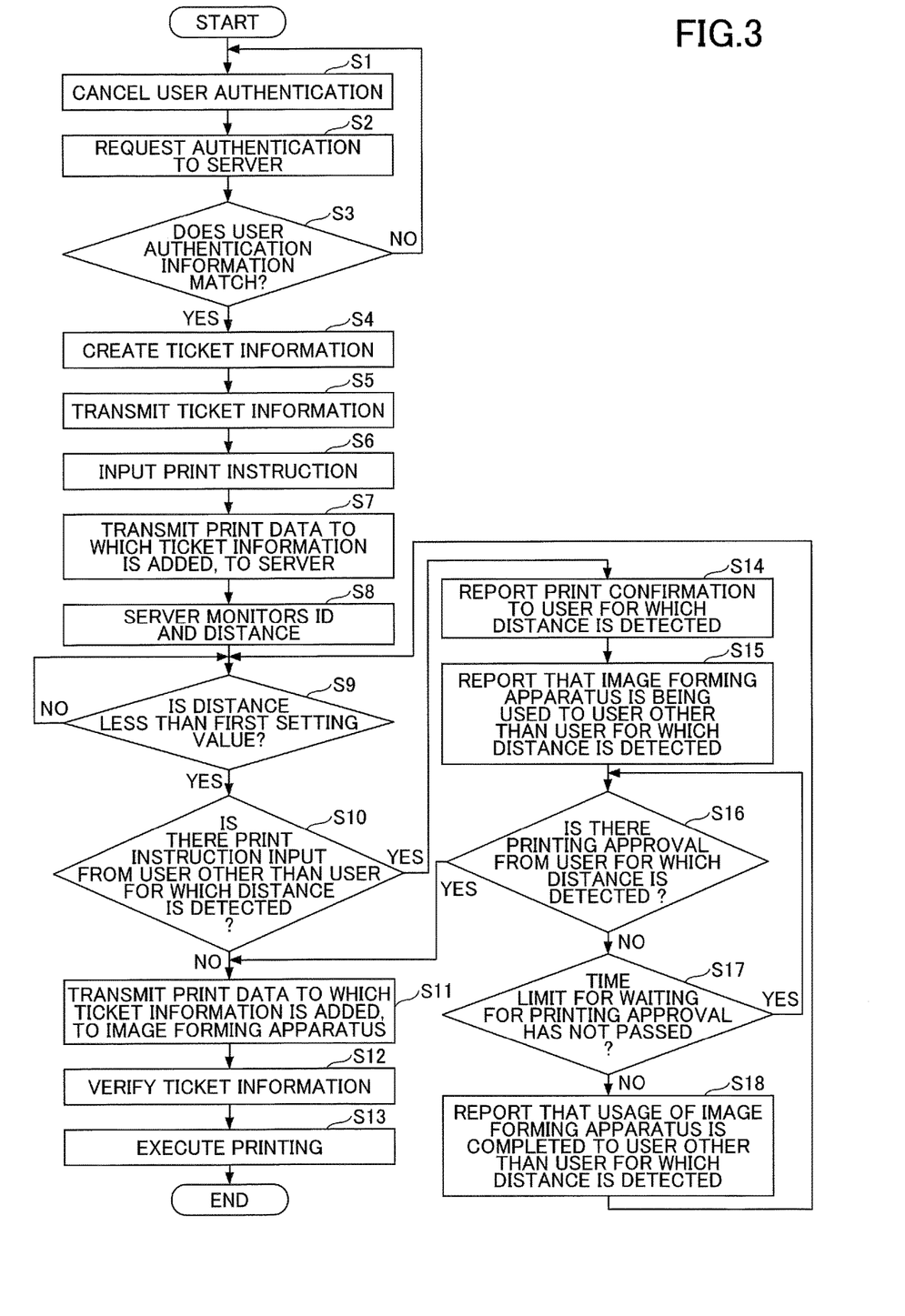
FIG. 3 is a flowchart illustrating an operation of the information processing system according to the first embodiment of the present invention.

Next, an operation of the information processing system 1 according to the first embodiment will be described. FIG. 3 is a flowchart illustrating an operation of the information processing system 1 according to the first embodiment of the present invention.

When the fingerprint sensor 11 of the mobile terminal apparatus 100 detects a user's fingerprint, the fingerprint sensor 11 matches the user's fingerprint to fingerprint information stored in the ROM 13. When the user's fingerprint matches the fingerprint information, the CPU 10 of the mobile terminal apparatus 100 cancels the user authentication (step S1).

When the user authentication is canceled, the CPU 10 of the mobile terminal apparatus 100 requests the server 200 to perform the authentication by using user registration information stored in the ROM 23 of the server 200. Authentication request information, which is information for requesting authentication, is received by the CPU 20 of the server 200 via the WLAN 16 of the mobile terminal apparatus 100 and the WLAN 21 of the server 200 (step S2).

The CPU 20 of the server 200 that has received the authentication request information determines whether the received authentication request information matches the user registration information stored in the ROM 23 of the server 200 (step S3).

When the authentication request information does not match the user registration information (NO in step S3), the CPU 20 of the server 200 transmits response information, that indicates the authentication request information does not match the user registration information, to the CPU 10 of the mobile terminal apparatus 100.

When the authentication request information matches the user registration information (YES in step S3), the CPU 20 of the server 200 creates authentication information (ticket information) that indicates the authentication request information matches the user registration information (step S4).

The CPU 20 of the server 200 transmits the created ticket information to the CPU 10 of the mobile terminal apparatus 100 (step S5). The ticket information is received by the CPU 10 of the mobile terminal apparatus 100 via the WLAN 21 of the server 200 and the WLAN of the mobile terminal apparatus 100. The CPU 10 of the mobile terminal apparatus 100 stores the received ticket information in the RAM 12 of the mobile terminal apparatus 100.

A user inputs a print instruction by a touch operation on the touch panel 15 of the mobile terminal apparatus 100 (step S6).

When the print instruction is input, the print data to which the ticket information is added is transmitted from the CPU 10 of the mobile terminal apparatus 100 to the CPU 20 of the server 200 (step S7).

The CPU 20 of the server 200 that has received the print data determines whether the ticket information added to the print data matches the ticket information stored in the ROM 23 of the server 200. When the ticket information added to the print data matches the ticket information stored in the ROM 23, the CPU 20 of the server 200 stores the print data in the RAM 22 of the server 200. As the BLE beacon 24 of the server 200 sends out signals, the server 200 monitors the distance to the mobile terminal apparatus and the identification information (ID) transmitted from the mobile terminal apparatus 100 (step S8).

The server 200 compares the measured distance with the first setting value 50 and determines whether the measured distance is less than the first setting value 50 (step S9). When the measured distance is not less than the first setting value 50 (NO in step S9), the process in step S9 is repeated.

When the measured distance is less than the first setting value 50 (YES in step S9), the process of step S10 is executed.

The CPU 20 (the transmitting unit 204) of the server 200 determines whether a print instruction has been input from a user other than the user who owns the mobile terminal apparatus 100 for which the distance has been detected, based on information stored in the ROM 23 (step S10). The ROM 23 can store the print data received from the mobile terminal apparatus 100 in association with information for identifying the user or the mobile terminal apparatus 100 that has transmitted the corresponding print data.

That is, the CPU 20 of the server 200 determines whether a print instruction is input only from the user who owns the mobile terminal apparatus 100 for which the distance has been determined to be less than the first setting value 50. A specific example is described as follows. For example, suppose there are two users near the server, and one user (a first user) owns a first mobile terminal apparatus and the other user (a second user) owns a second mobile terminal apparatus. In this case, the above-described "user who owns the mobile terminal apparatus 100 for which the distance has been detected" is, for example, the first user holding the first mobile terminal apparatus for which the distance to the server has been determined to be less than the first setting value of 50. Further, the above-described "user other than the user who owns the mobile terminal apparatus 100 for which the distance has been detected" is, for example, the second user holding the second mobile terminal apparatus present within a distance that is greater than or equal to the first setting value 50 to the server. When a print instruction has not been input from the second user, that is, when a print instruction is input only from the first user (NO in step S10), the process of step S11 is executed.

The CPU 20 (the transmitting unit 204) of the server 200 transmits the print data to which the ticket information is added, to the CPU 30 of the image forming apparatus 300. This data is transmitted to the CPU 30 of the image forming apparatus 300 via the WLAN 21 of the server 200 and the WLAN 36 of the image forming apparatus 300 (step S11).

The CPU 30 of the image forming apparatus 300 that has received the data determines whether the ticket information included in the received data matches the ticket information stored in the ROM 33 of the image forming apparatus 300, that is, the image forming apparatus 300 verifies the ticket information (step S12).

When the ticket information match each other, the CPU 30 of the image forming apparatus 300 stores the print data in the RAM 32 and executes printing (executes the printing function) (step S13). That is, the printing function 31, which is a function implemented by the CPU 30 of the image forming apparatus 300, prints the contents of the print data to which the authentication information is added, transmitted from the transmitting unit 204 of the server 200.

Returning to step S10, when a print instruction has been input from a user (second user) other than the user who owns the mobile terminal apparatus 100 for which the distance has been detected, that is, when a print instruction is input from both the first user and the second user (YES in step S10), the process of step S14 is executed.

The transmitting unit 204 of the server 200 sends a print confirmation report to the mobile terminal apparatus 100 (the first mobile terminal apparatus) owned by the corresponding user (the first user).

Accordingly, for example, a message prompting an operation such as "YES" or "NO" is displayed on the display 14 of the mobile terminal apparatus 100 (step S14). Specifically, the print confirmation report includes information including, for example, the URL of an approval screen. On the approval screen, a message requesting the first user who is the approver to determine whether printing is allowed, print data attribute information transmitted by the first user, a thumbnail image of the print data, a print allowance button for instructing to allow printing by the second user, and a print rejection button for instructing to reject the printing by the second user, are disposed. The print data attribute information includes the document name of the print data, transmitter information, and destination information. The print confirmation report may be transmitted by e-mail or maybe transmitted by a push notification. Further, the print confirmation report may be a confirmation screen for sending a query as to whether to execute printing of the print data transmitted by the first user, instead of the approval screen indicating whether to allow printing to the second user. In this case, the confirmation report may be sent to the mobile terminal owned by the first user, regardless of whether there is any print instruction input from a user other than the user for which the distance has been detected.

On the other hand, the transmitting unit 204 of the server 200 reports a predetermined message to the mobile terminal apparatus 100 (the second mobile terminal apparatus) owned by a user (the second user) other than the corresponding user (step S15). The predetermined message may be, for example, character information in which it is described that the image forming apparatus 300 is used by another user and is unavailable for use at present. Specifically, the transmitting unit 204 of the server 200 identifies the second user based on the user registration information stored in the ROM 23 of the server 200, creates a predetermined message based on message information stored in the ROM 23, and transmits the created predetermined message to a mail address included in the user registration information. Accordingly, on the display 14 of the mobile terminal apparatus 100 owned by a user (the second user) other than the corresponding user, a message that indicates the image forming apparatus 300 is used by another user (the first user) and is unavailable for use at present, is displayed.

The CPU 20 of the server 200 confirms whether there is a report of printing approval from the corresponding user (the first user) (step S16).

When there is an approval report (YES in step S16), the processes of steps S11 to S13 are executed. That is, when the first user instructs print allowance for the second user by pressing the print allowance button on the approval screen, the second user can execute printing. In this case, the print data received from the first user is not printed until printing by the second user is ended or until the first user transmits a print instruction to the server again.

When there is no approval report (NO in step S16), for example, the CPU 20 of the server 200 determines whether the elapsed time from the time point when the report is issued in step S14, has passed a predetermined time limit for waiting for printing approval (step S17).

When the elapsed time has not passed the time limit for waiting for printing approval (YES in step S17), the process in step S16 is executed again.

When the elapsed time has passed the time limit for waiting for printing approval (NO in step S17), the CPU 20 of the server 200 reports a predetermined message to the mobile terminal apparatus 100 of a user (the second user described above) other than the corresponding user (step S18). The predetermined message may be, for example, character information in which it is described that usage of the image forming apparatus 300 by the other user has been completed. Specifically, the transmitting unit 204 of the server 200 identifies the second user based on the user registration information stored in the ROM 23 of the server 200, creates a predetermined message based on the message information stored in the ROM 23, and transmits the created predetermined message to the mail address included in the user registration information. Accordingly, on the display 14 of the mobile terminal apparatus 100 owned by a user (the second user) other than the corresponding user, a message that indicates usage of the image forming apparatus 300 by another user (the first user) is completed, is displayed. Thereafter, the process of step S9 is executed again.

As described above, the information processing system according to the first embodiment includes an image forming apparatus, a server, and a mobile terminal apparatus. The server includes an authenticating unit that authenticates a user based on authentication information that indicates the user has been authenticated, and a distance measuring unit that measures the distance between the server and the mobile terminal apparatus. The server includes a detecting that detects the mobile terminal apparatus present within a specified range from the server by using the measured distance; and a transmitting unit. When the user is authenticated by the authenticating unit, the detecting unit detects the mobile terminal apparatus that is present within a specified range from the server. When print data is input from each of a plurality of the mobile terminal apparatuses, the transmitting unit transmits a print confirmation report, which is a report for confirming whether printing is allowed or rejected, to a first mobile terminal apparatus that is present within the specified range, among the plurality of the mobile terminal apparatuses. Further, the transmitting unit reports that the image forming apparatus is currently used by the user who owns the first mobile terminal apparatus, to a second mobile terminal apparatus other than the first mobile terminal apparatus. Only after the user of the first mobile terminal apparatus approves the printing in response to the print confirmation report, does the transmitting unit add the authentication information to the print data from the first mobile terminal apparatus, and then transmit the print data to the image forming apparatus. The image forming apparatus includes a printing unit that prints the contents of the print data to which the authentication information is added, transmitted from the transmitting unit.

According to the above configuration, for example, when two users are present near the server and it is detected that the first mobile terminal apparatus owned by the first user is present within a specified distance from the server, a print confirmation report is transmitted to the first mobile terminal apparatus. When the first user performs a printing approval operation in response to the print confirmation report, a printing approval report is returned, and printing based on the print data from the first mobile terminal apparatus is executed. At this time, the second mobile terminal apparatus receives a report that indicates the first user is currently performing printing, and, therefore, the second user can recognize that printing based on print data from the second mobile terminal apparatus cannot be performed even when the second user approaches the server so that the second user is within a specified distance from the server. Therefore, the second user does not need to wait until his or her printed matter is printed after approaching the server. Further, the risk of the printed matter of the first user being collected by the second user, can be reduced. Further, when the first user does not give approval within a specified time or when the first user performs a printing rejection operation, a print confirmation report is transmitted to the second mobile terminal apparatus of the second user. Therefore, the second user, who is the user of the second mobile terminal apparatus that has received the print confirmation report, can collect the printed matter of the second user at a timing when the printing by the first user has ended. That is, the second user can recognize the timing when printing by the first user ends, by receiving a report, and, therefore, the second user can concentrate on other work until the printing of the first user is ended, thereby improving the operational efficiency.

Second Embodiment

Figure 4:
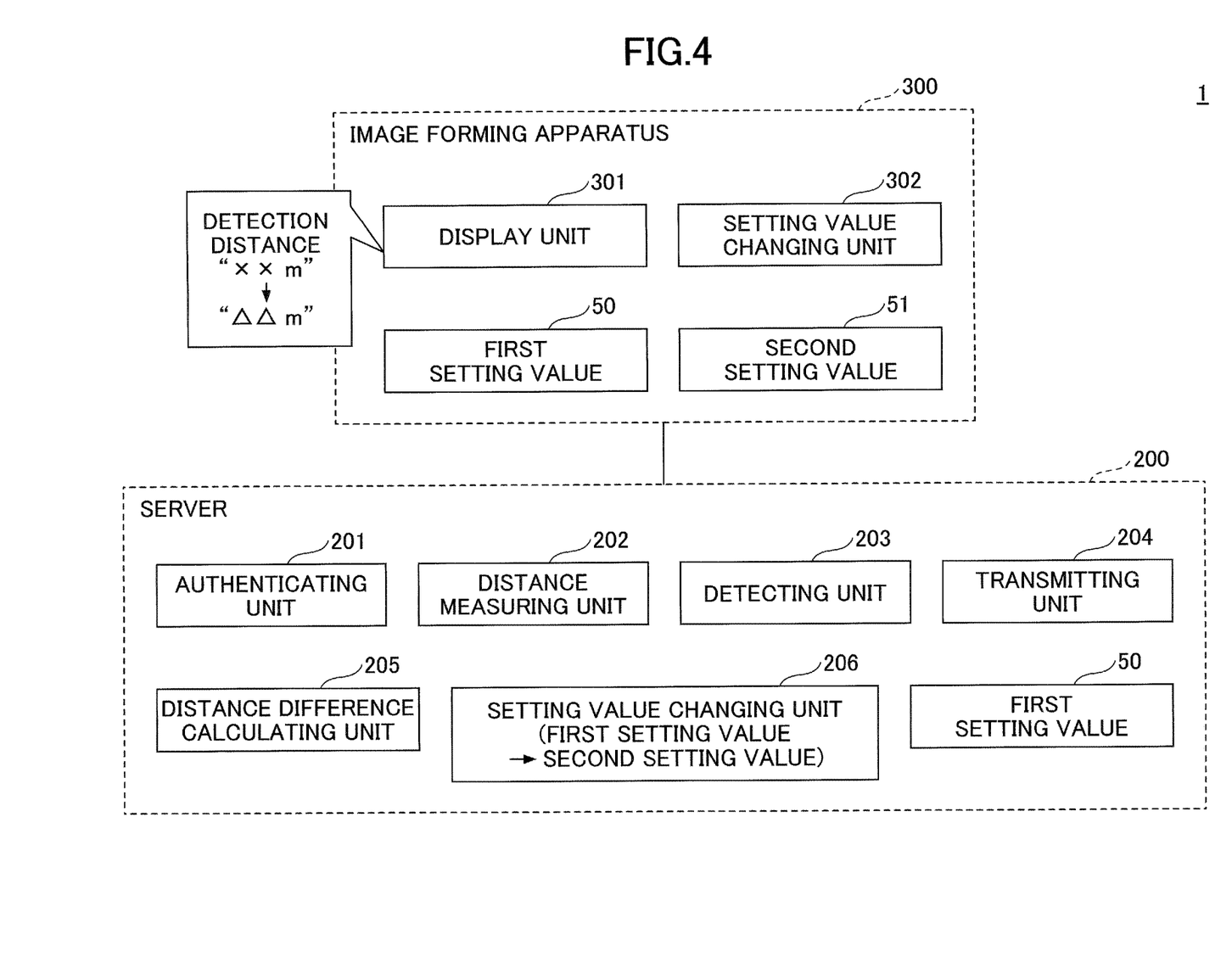
FIG. 4 is a diagram illustrating an example of a software configuration of an image forming apparatus and a server included in the information processing system according to a second embodiment of the present invention.

FIG. 6 is a diagram illustrating an example of a software configuration of the image forming apparatus 300 and the server 200 included in the information processing system 1 according to a second embodiment of the present invention. The image forming apparatus 300 according to the second embodiment includes a display unit 301 and a setting value changing unit 302.

The display unit 301 may be, for example, a touch panel or an organic electro-luminescence (EL) display. For example, when the image forming apparatus 300 is a multifunction peripheral, the display unit 301 includes a screen for setting the number of copies or the format of the document to be printed. For example, an icon for entering the number of copies of the document to be printed, and an icon for changing the printing format of the document, are displayed on the screen. Further, for example, an icon for changing the first setting value 50 is also displayed on the screen.

When the first setting value 50 displayed on the display unit 301 is changed, the setting value changing unit 302 transmits a second setting value 51, which is the value after changing the first setting value 50, to the server 200. The second setting value 51 is equal to the distance in which the detecting unit 203 can detect the mobile terminal apparatus 100. The second setting value 51 is different from the first setting value 50. To implement the setting value changing unit 302, the program for the image forming apparatus 300 is stored in the ROM 33 illustrated in FIG. 1, and the CPU 30 executes the program, thereby implementing the setting value changing unit 302 of the image forming apparatus 300. The program for the image forming apparatus 300 is a program for executing the function of the setting value changing unit 302.

The server 200 according to the second embodiment includes a setting value changing unit 206 in addition to the authenticating unit 201, the distance measuring unit 202, the detecting unit 203, the transmitting unit 204, and the distance difference calculating unit 205. The setting value changing unit 206 changes the setting value used by the detecting unit 203, from the first setting value 50 to the second setting value 51. The operation of the setting value changing unit 206 will be described later.

Figure 5:
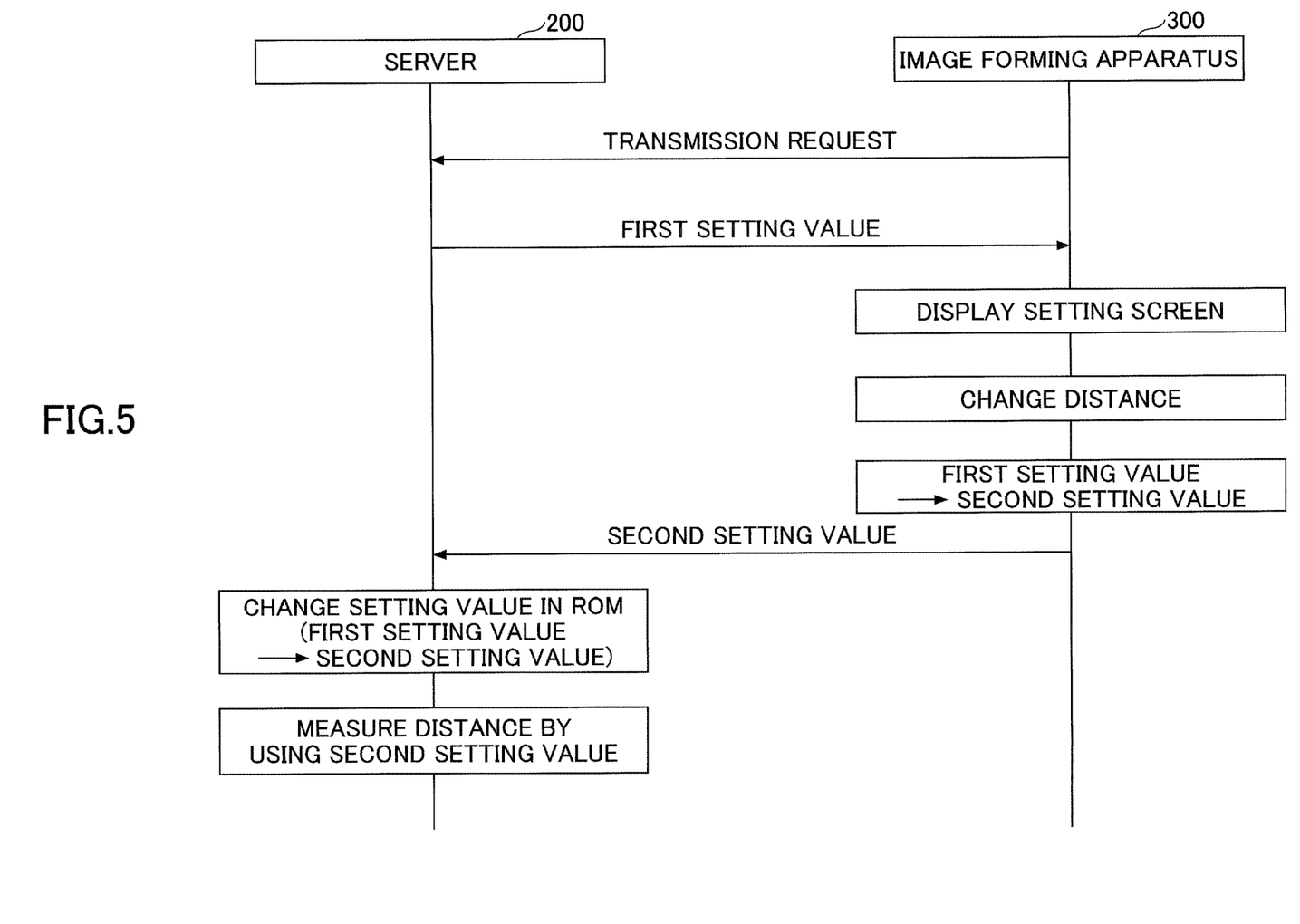
FIG. 5 is a sequence chart illustrating an operation of the information processing system according to the second embodiment of the present invention.

Next, an operation of the information processing system 1 according to the second embodiment will be described. FIG. 5 is a sequence chart illustrating an operation of the information processing system 1 according to the second embodiment of the present invention.

When an operation for changing the detection distance is started in the display unit 301, the setting value changing unit 302 requests the CPU 20 of the server 200 to transmit the first setting value 50.

The CPU 20 of the server 200 reads out the first setting value 50 stored in the ROM 23 of the server 200 in response to the transmission request, and transmits the first setting value 50 to the image forming apparatus 300.

The image forming apparatus 300 receives the first setting value 50 and causes the display unit 301 to display a detection distance corresponding to the first setting value 50 as "XXm", for example. When the displayed distance is changed to "ΔΔm" by the user, the distance information after the change is transmitted to the setting value changing unit 302.

The setting value changing unit 302 generates the second setting value 51 based on the distance information after the change, and transmits the generated second setting value 51 to the server 200 instead of the first setting value 50.

The setting value changing unit 206 of the server 200 that has received the second setting value 51, sets the second setting value 51 to the detecting unit 203. The detecting unit 203 detects the mobile terminal apparatus 100 that is present within a specified range from the server 200, by using the second setting value 51, instead of the first setting value 50 stored in the ROM 23 of the server 200.

The operation of changing the first setting value to the second setting value is not limited to the changing operation performed with respect to the display unit; it is possible to change the first setting value to the second setting value by a voice sound operation by using a voice sound recognition function.

As described above, when the first setting value is changed to the second setting value by the user, the detecting unit of the information processing system 1 according to the second embodiment detects the mobile terminal apparatus that is present within a specified range from the server 200, by using the distance measured by the distance measuring unit and the second setting value. By this configuration, the first setting value 50 can be changed to any value according to the installation environment of the server 200 and the image forming apparatus 300.

Third Embodiment

Figure 6:
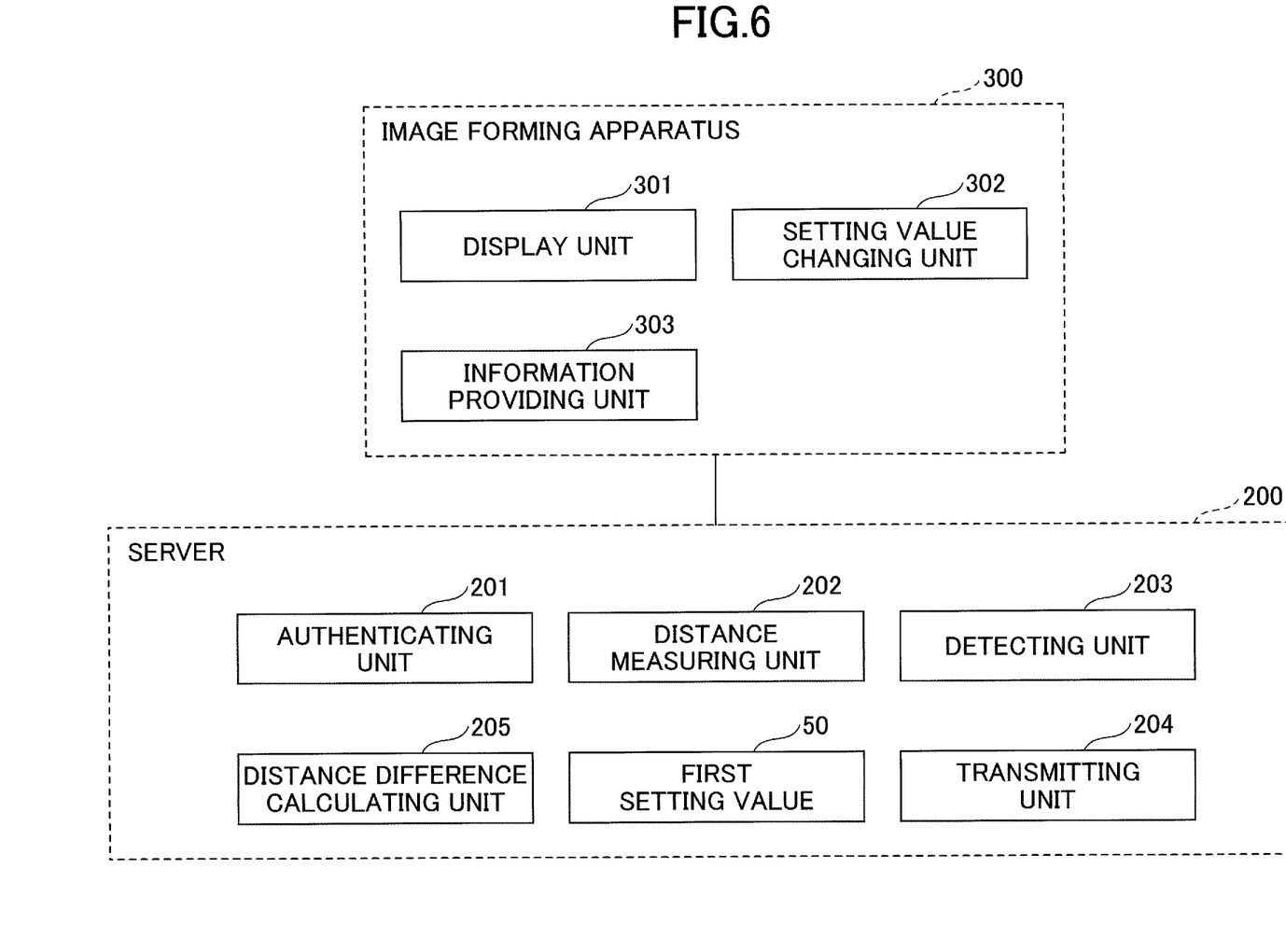
FIG. 6 is a diagram illustrating an example of a software configuration of an image forming apparatus and a server included in the information processing system according to a third embodiment of the present invention.

FIG. 6 is a diagram illustrating an example of a software configuration of the image forming apparatus 300 and the server 200 included in the information processing system 1 according to a third embodiment of the present invention. The image forming apparatus 300 according to the third embodiment includes an information providing unit 303 in addition to the display unit 301 and the setting value changing unit 302. The information providing unit 303 generates information to be provided to the user and outputs the generated information to the display unit 301.

Figure 7:
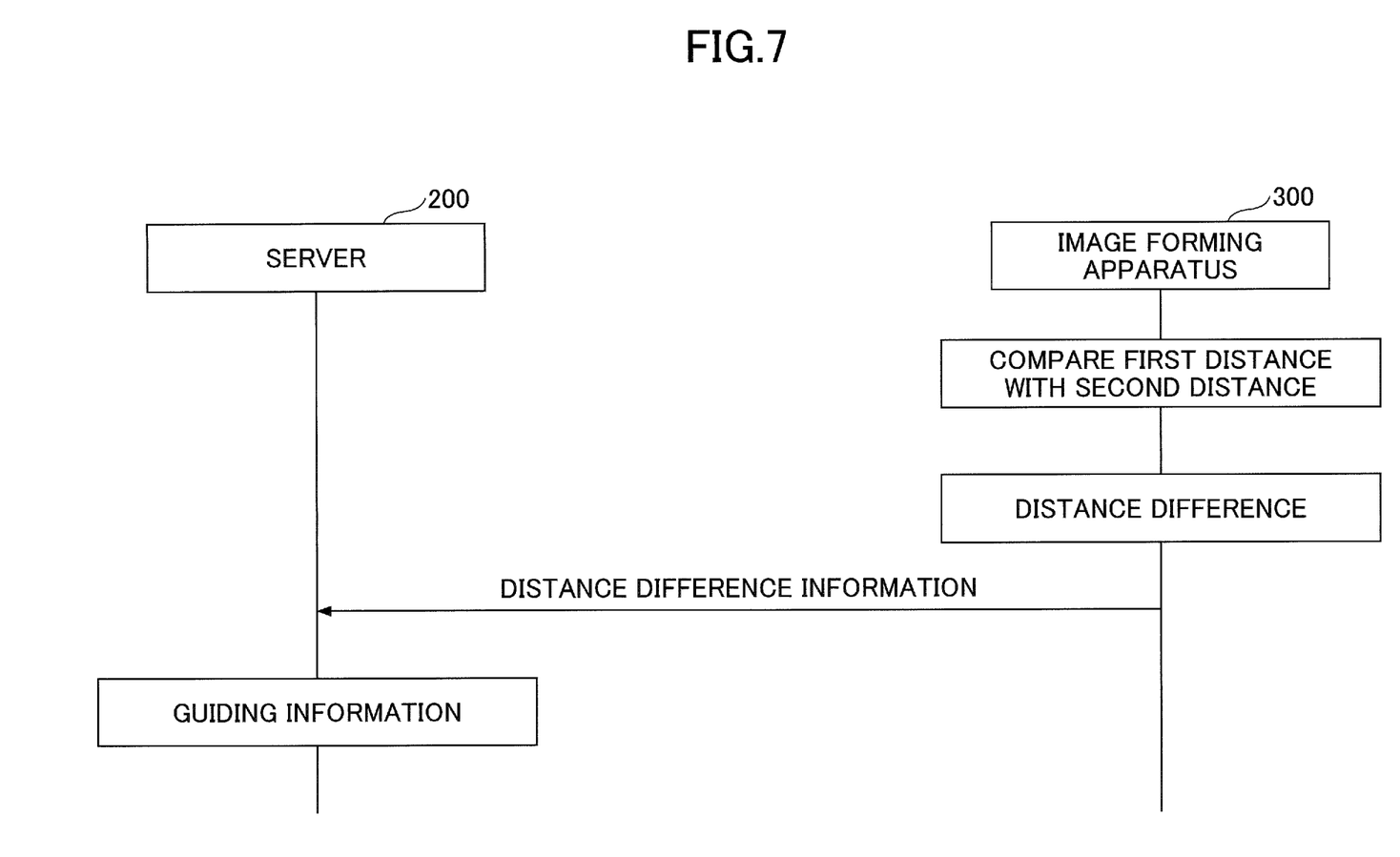
FIG. 7 is a sequence chart illustrating an operation of the information processing system according to the third embodiment of the present invention.

Next, an operation of the information processing system 1 according to the third embodiment will be described. FIG. 7 is a sequence chart illustrating an operation of the information processing system 1 according to the third embodiment of the present invention. When the distance measured by the distance measuring unit 202 (the first distance) is greater than the distance (the second distance) in which the detecting unit 203 can detect the mobile terminal apparatus 100, the distance difference calculating unit 205 calculates the a distance difference corresponding to the difference between the first distance and the second distance. The distance difference is transmitted to the server 200 as distance difference information indicating the content of the distance difference.

Figure 8A:
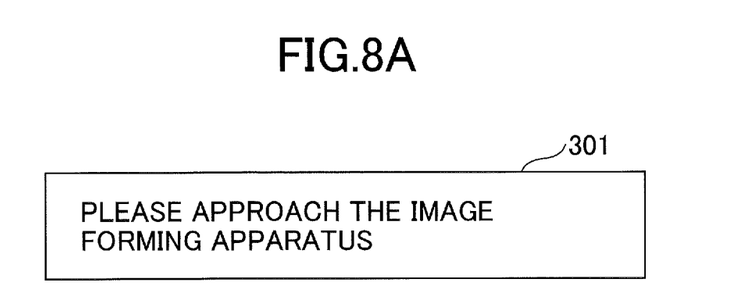
FIGS. 8A to 8C are diagrams illustrating examples of message information generated by an information providing unit according to the third embodiment of the present invention.
Figure 8B:
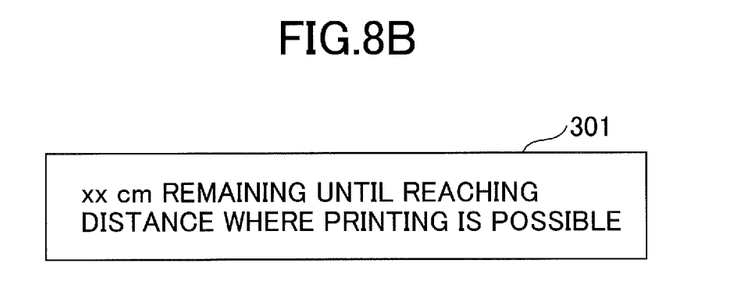
Figure 8C:
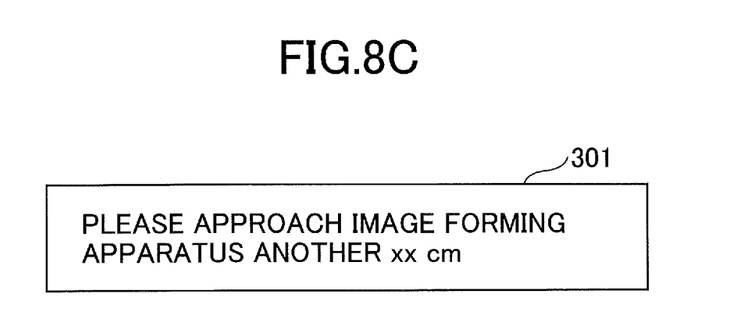

The information providing unit 303 that has received the distance difference information generates message information, for example, as illustrated in FIGS. 8A to 8C, and causes the display unit 301 to display the message information. FIGS. 8A to 8C are diagrams illustrating examples of the message information generated by the information providing unit 303 according to the third embodiment of the present invention.

The first example of message information is, for example, "PLEASE APPROACH THE IMAGE FORMING APPARATUS" (FIG. 8A). This is guidance message information that prompts the user to approach the image forming apparatus 300.

The second example of message information is, for example, "XX cm REMAINING UNTIL REACHING DISTANCE WHERE PRINTING IS POSSIBLE" (FIG. 8B). This is remaining distance message information that informs the user of the distance to the image forming apparatus 300.

The third example of message information is, for example, "PLEASE APPROACH IMAGE FORMING APPARATUS ANOTHER XX cm" (FIG. 8C). This is guidance message information that prompts the user to approach the image forming apparatus 300 by a specified distance.

Each of the above pieces of message information can be reported by a speaker with voice sound, other than being displayed on the display unit 301. Further, the configuration according to the third embodiment can be combined with the second embodiment.

As described above, according to the information processing system 1 according to the third embodiment, it is possible to make the user specifically recognize the distance at which printing is possible. Accordingly, in addition to the effect according to the first embodiment, it is possible to obtain the effect that the convenience of the user can be improved.

Further, in the information processing method according to the present embodiment, the server 200 authenticates the user based on the authentication information that indicates the user has been authenticated, measures the distance between the server 200 and the mobile terminal apparatus, and detects the mobile terminal apparatus that is present within a specified range from the server 200 by using the measured distance. When the user is authenticated, and a mobile terminal apparatus that is present within a specified range from the server 200 is detected, and print data is input from each of a plurality of the mobile terminal apparatuses, the server 200 transmits a print confirmation report, which is a report for confirming whether printing is allowed or rejected, to a first mobile terminal apparatus that is present within the specified range, among the plurality of the mobile terminal apparatuses. Further, the server 200 reports that the image forming apparatus is currently used by the user who owns the first mobile terminal apparatus, to a second mobile terminal apparatus other than the first mobile terminal apparatus. Only after the user of the first mobile terminal apparatus approves the printing in response to the print confirmation report, does the server 200 add the authentication information to the print data from the first mobile terminal apparatus, and then transmit the print data to the image forming apparatus. The image forming apparatus 300 executes a predetermined process based on the transmitted print data to which the authentication information is added.

Accordingly, the smart device and the image forming apparatus 300 cooperate with each other, and the authentication operation at the image forming apparatus 300 is omitted, so that it is possible to realize the image forming apparatus 300 for which the cost is reduced while increasing the convenience. Further, the second user does not need to wait until his or her printed matter is printed after approaching the server. Further, the risk of the printed matter of the first user being collected by the second user, can be reduced. Further, when the first user does not give approval within a specified time or when the first user performs a printing rejection operation, a print confirmation report is transmitted to the second mobile terminal apparatus of the second user. Therefore, the second user, who is the user of the second mobile terminal apparatus that has received the print confirmation report, can collect the printed matter of the second user at a timing when the printing by the first user has ended.

Further, a program according to the present embodiment causes the server 200 to authenticate the user based on the authentication information that indicates the user has been authenticated, measure the distance between the server 200 and the mobile terminal apparatus, and detect the mobile terminal apparatus that is present within a specified range from the server 200 by using the measured distance. When the user is authenticated, and a mobile terminal apparatus that is present within a specified range from the server 200 is detected, and print data is input from each of a plurality of the mobile terminal apparatuses, the program causes the server 200 to (i) transmit a print confirmation report, which is a report for confirming whether printing is allowed or rejected, to a first mobile terminal apparatus that is present within the specified range, among the plurality of the mobile terminal apparatuses, and (ii) report that the image forming apparatus is currently used by the user who owns the first mobile terminal apparatus, to a second mobile terminal apparatus other than the first mobile terminal apparatus. Only after the user of the first mobile terminal apparatus approves the printing in response to the print confirmation report, does the program cause the server 200 to add the authentication information to the print data from the first mobile terminal apparatus, and then transmit the print data to the image forming apparatus. The program causes the image forming apparatus 300 to execute a predetermined process based on the transmitted print data to which the authentication information is added.

Accordingly, the smart device and the image forming apparatus 300 cooperate with each other, and the authentication operation at the image forming apparatus 300 is omitted, so that it is possible to realize the image forming apparatus 300 for which the cost is reduced while increasing the convenience. Further, the second user does not need to wait until his or her printed matter is printed after approaching the server. Further, the risk of the printed matter of the first user being collected by the second user, can be reduced. Further, when the first user does not give approval within a specified time or when the first user performs a printing rejection operation, a print confirmation report is transmitted to the second mobile terminal apparatus of the second user. Therefore, the second user, who is the user of the second mobile terminal apparatus that has received the print confirmation report, can collect the printed matter of the second user at a timing when the printing by the first user has ended.

According to one embodiment of the present invention, the user's privacy is protected while preventing theft of printed matter.

The information processing system, the information processing method, and the recording medium are not limited to the specific embodiments described in the detailed description, and variations and modifications may be made without departing from the spirit and scope of the present invention.

What is claimed is:

1. An information processing system comprising:
an image forming apparatus;
a server; and
a mobile terminal apparatus, wherein
the server includes
processing circuitry; and
a memory storing computer-executable instructions that cause the processing circuitry to:
authenticate a user based on authentication information that indicates the user has been authenticated,
measure a distance between the server and the mobile terminal apparatus,
detect the mobile terminal apparatus that is present within a predetermined range from the server by using the measured distance, and
transmit, wherein upon detecting that the user has been authenticated; that the mobile terminal apparatus that is present within the predetermined range from the server is detected; and that the server has received input of print data from each of a plurality of the mobile terminal apparatuses:
a print confirmation report, which is for confirming whether printing is allowed or rejected, to a first mobile terminal apparatus that is the mobile terminal apparatus detected to be present within the predetermined range among the plurality of the mobile terminal apparatuses,
a report, which indicates that the image forming apparatus is being used by the user who owns the first mobile terminal apparatus, to a second mobile terminal apparatus other than the first mobile terminal apparatus among the plurality of the mobile terminal apparatuses, and
the print data to the image forming apparatus after adding the authentication information to the print data received from the first mobile terminal apparatus, only upon detecting that the user of the first mobile terminal apparatus has approved the printing in response to the print confirmation report, and wherein
the image forming apparatus includes
processing circuitry; and
a memory storing computer-executable instructions that cause the processing circuitry of the image forming apparatus to:
print a content of the print data to which the authentication information is added and transmitted from the server.

2. The information processing system according to claim 1, wherein the processing circuitry of the server detects the mobile terminal apparatus that is present within the predetermined range from the server, by using the measured distance and a second setting value, upon detecting that a first setting value, which is distance information by which the processing circuitry of the server is able to detect the mobile terminal apparatus, has been changed by the user to the second setting value that is different from the first setting value.

3. The information processing system according to claim 1, wherein
the processing circuitry of the server is caused to
calculate a distance difference corresponding to a difference between a first distance and a second distance, upon detecting that the measured first distance is greater than a second distance in which the processing circuitry of the server is able to detect the mobile terminal apparatus, and
the processing circuitry of the image forming apparatus is caused to
generate guidance message information for prompting the user to approach the image forming apparatus, based on distance difference information indicating the distance difference, and to provide the guidance message information to the user.

4. The information processing system according to claim 1, wherein
the processing circuitry of the server is caused to
calculate a distance difference corresponding to a difference between a first distance and a second distance, upon detecting that the measured first distance is greater than the second distance in which the processing circuitry of the server is able to detect the mobile terminal apparatus, and
the processing circuitry of the image forming apparatus is caused to
generate remaining distance message information for reporting, to the user, a distance to the image forming apparatus, based on distance difference information indicating the distance difference, and to provide the remaining distance message information to the user.

5. The information processing system according to claim 1, wherein
the processing circuitry of the server is caused to
calculate a distance difference corresponding to a difference between a first distance and a second distance, upon detecting that the measured first distance is greater than the second distance in which the processing circuitry of the server is able to detect the mobile terminal apparatus, and
the processing circuitry of the image forming apparatus is caused to
generate guidance message information for prompting the user to approach the image forming apparatus by a predetermined distance, based on distance difference information indicating the distance difference, and to provide the guidance message information to the user.

6. An information processing method comprising:
authenticating, by a server, a user based on authentication information that indicates the user has been authenticated;

measuring, by the server, a distance between the server and a mobile terminal apparatus;

detecting, by the server, the mobile terminal apparatus that is present within a predetermined range from the server by using the measured distance; and transmitting, by the server, wherein upon detecting that the user has been authenticated; that the mobile terminal apparatus that is present within the predetermined range from the server is detected; and that the server has received input of print data from each of a plurality of the mobile terminal apparatuses:

a print confirmation report, which is for confirming whether printing is allowed or rejected, to a first mobile terminal apparatus that is the mobile terminal apparatus detected to be present within the predetermined range among the plurality of the mobile terminal apparatuses, a report, which indicates that an image forming apparatus is being used by the user who owns the first mobile terminal apparatus, to a second mobile terminal apparatus other than the first mobile terminal apparatus among the plurality of the mobile terminal apparatuses, and the print data to the image forming apparatus after adding the authentication information to the print data received from the first mobile terminal apparatus, only upon detecting that the user of the first mobile terminal apparatus has approved the printing in response to the print confirmation report; and printing, by the image forming apparatus, a content of the print data to which the authentication information is added and transmitted from the server.

7. A non-transitory computer-readable recording medium storing a program that causes a computer to execute a process performed in a server and an image forming apparatus, the process comprising:

authenticating, by a server, a user based on authentication information that indicates the user has been authenticated;

measuring, by the server, a distance between the server and a mobile terminal apparatus;

detecting, by the server, the mobile terminal apparatus that is present within a predetermined range from the server by using the measured distance; and transmitting, by the server, wherein upon detecting that the user has been authenticated; that the mobile terminal apparatus that is present within the predetermined range from the server is detected; and that the server has received input of print data from each of a plurality of the mobile terminal apparatuses:

a print confirmation report, which is for confirming whether printing is allowed or rejected, to a first mobile terminal apparatus that is the mobile terminal apparatus detected to be present within the predetermined range among the plurality of the mobile terminal apparatuses, a report, which indicates that an image forming apparatus is being used by the user who owns the first mobile terminal apparatus, to a second mobile terminal apparatus other than the first mobile terminal apparatus among the plurality of the mobile terminal apparatuses, and the print data to the image forming apparatus after adding the authentication information to the print data received from the first mobile terminal apparatus, only upon detecting that the user of the first mobile terminal apparatus has approved the printing in response to the print confirmation report; and printing, by the image forming apparatus, a content of the print data to which the authentication information is added and transmitted from the server.

* * * * *